(12) United States Patent
Yamada

(10) Patent No.: US 8,012,020 B2
(45) Date of Patent: Sep. 6, 2011

(54) GAME DEVICE, GAME CONTROL, METHOD, INFORMATION RECORDING MEDIUM AND PROGRAM

(75) Inventor: Michio Yamada, Tokyo (JP)

(73) Assignee: Konami Digital Entertainment Co., Ltd., Tokyo (JP)

(*) Notice: Subject to any disclaimer, the term of this patent is extended or adjusted under 35 U.S.C. 154(b) by 1043 days.

(21) Appl. No.: 11/817,129

(22) PCT Filed: Feb. 28, 2006

(86) PCT No.: PCT/JP2006/303747
§ 371 (c)(1),
(2), (4) Date: Aug. 24, 2007

(87) PCT Pub. No.: WO2006/093146
PCT Pub. Date: Sep. 8, 2006

(65) Prior Publication Data
US 2009/0011831 A1    Jan. 8, 2009

(30) Foreign Application Priority Data

Feb. 28, 2005   (JP) ................................. 2005-052548

(51) Int. Cl.
*A63F 13/00*    (2006.01)

(52) U.S. Cl. ............... 463/34; 463/16; 463/30; 463/31; 463/43

(58) Field of Classification Search .................... 463/16, 463/30, 31, 34, 43
See application file for complete search history.

(56) References Cited

U.S. PATENT DOCUMENTS

| | | | |
|---|---|---|---|
| 6,488,505 B1 * | 12/2002 | Hightower | 434/69 |
| 7,210,997 B2 * | 5/2007 | Hughs-Bair et al. | 463/20 |
| 7,300,352 B2 * | 11/2007 | Rowe | 463/32 |
| 7,601,055 B2 * | 10/2009 | Eika | 463/6 |

(Continued)

FOREIGN PATENT DOCUMENTS

JP    2000-176156 A    6/2000

(Continued)

OTHER PUBLICATIONS

Supplementary Report from the European Patent Office for Application No. 06714877.5, PCT/JP2006303747, mailed Apr. 15, 2008, 7 pages total.

(Continued)

*Primary Examiner* — Pierre Eddy Elisca
*Assistant Examiner* — Shahid Kamal
(74) *Attorney, Agent, or Firm* — Howard & Howard Attorneys PLLC

(57) ABSTRACT

In a game device (301) for showing a past operation history to a player in comparison with the current operation status, a first moving unit (303) moves a first object in a virtual space based on a moving instruction input received by an input receiving unit (302), an input history storage unit (304) stores the moving instruction input as input history information, a second moving unit (305) moves a second object in the virtual space based on input history information stored in the past, an assessment unit (306) assesses whether or not the first object and the second object are overlapping in the virtual space, and a display unit (307) displays the second object in a case where a non-overlapping state has been identified and stops the display of the second object in a case where an overlapping state has been identified.

7 Claims, 9 Drawing Sheets

U.S. PATENT DOCUMENTS

| | | |
|---|---|---|
| 2004/0267386 A1 | 12/2004 | Hightower |
| 2005/0176502 A1* | 8/2005 | Nishimura et al. ............. 463/31 |
| 2005/0255900 A1* | 11/2005 | Takahashi et al. ................ 463/3 |
| 2007/0021201 A1* | 1/2007 | Matsumoto ..................... 463/30 |
| 2007/0232395 A1* | 10/2007 | Fujii ............................... 463/36 |

FOREIGN PATENT DOCUMENTS

| | | |
|---|---|---|
| JP | 2000 237451 A | 9/2000 |
| JP | 2005-058383 A | 3/2005 |
| WO | WO 2004/052483 A1 | 6/2004 |
| WO | WO 2004/052483 | * 12/2004 ....................... 13/12 |

OTHER PUBLICATIONS

Yamazaki, "Microcomputer BASIC Magazine," 1999 Nen 1 Gatsugo, Denpa Shinbunsha, Jan. 1, 1999, vol. 18, No. 1, pp. 69-71, 7 pages total.

International Search Report and Written Opinion for PCT/JP2006/303747 dated Mar. 22, 2006, 2 pages.

* cited by examiner

NO OVERLAP

OVERLAP

NO OVERLAP

OVERLAP

NO OVERLAP

OVERLAP

NO OVERLAP

OVERLAP

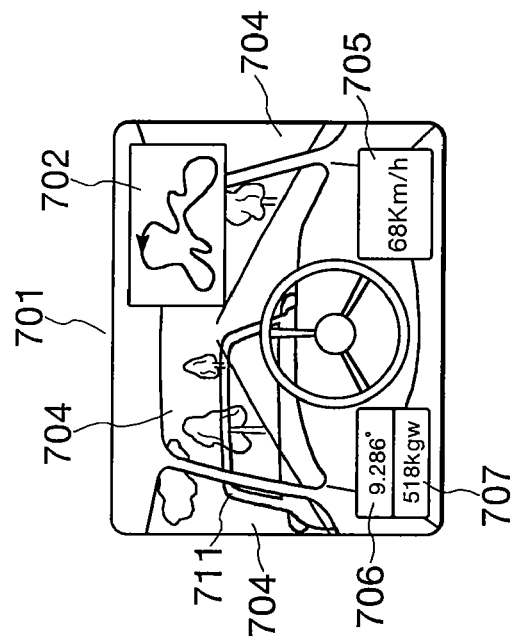
FIG.9A
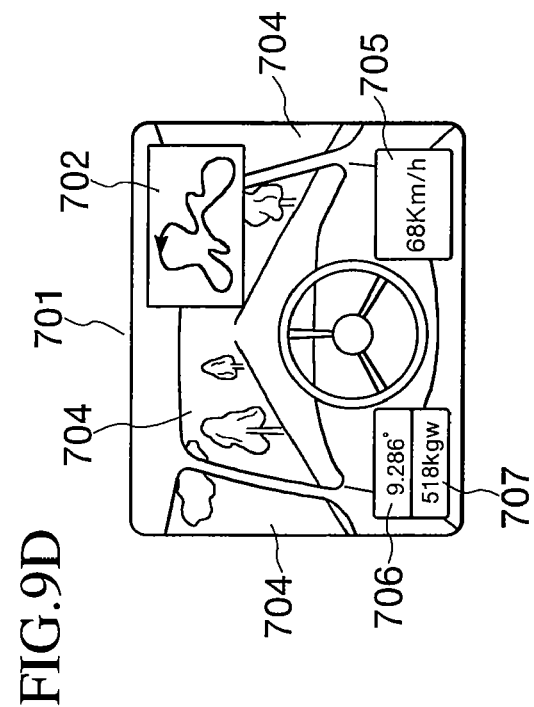
FIG.9C
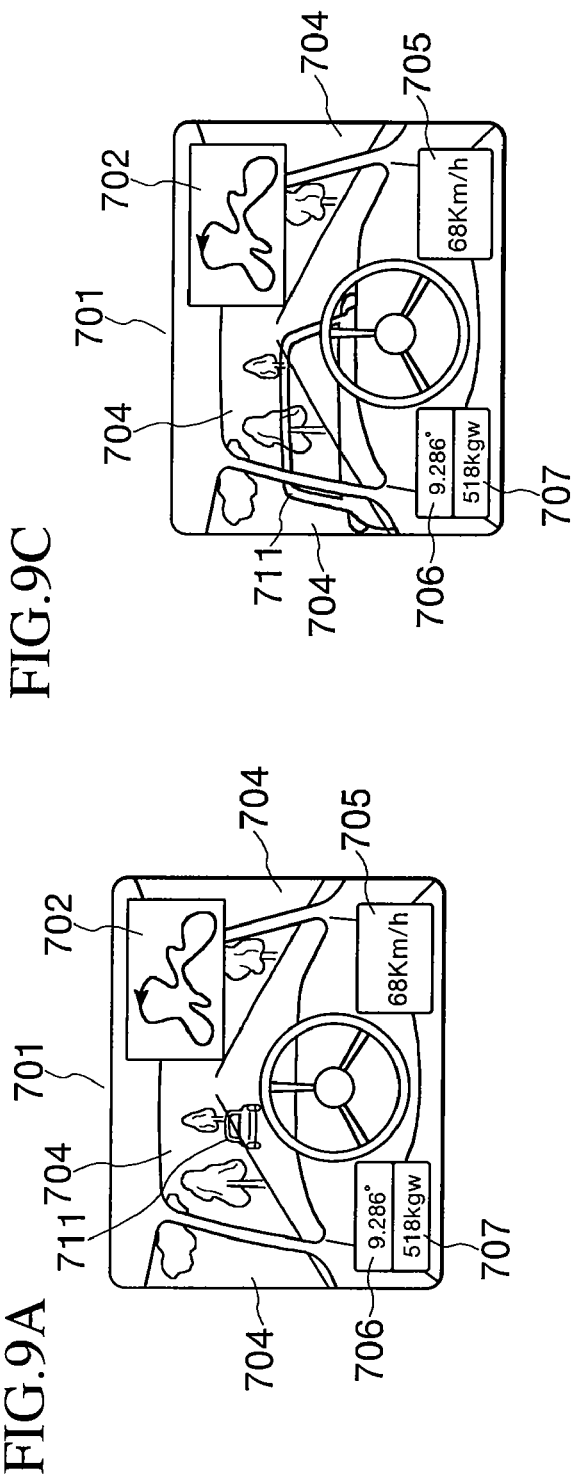
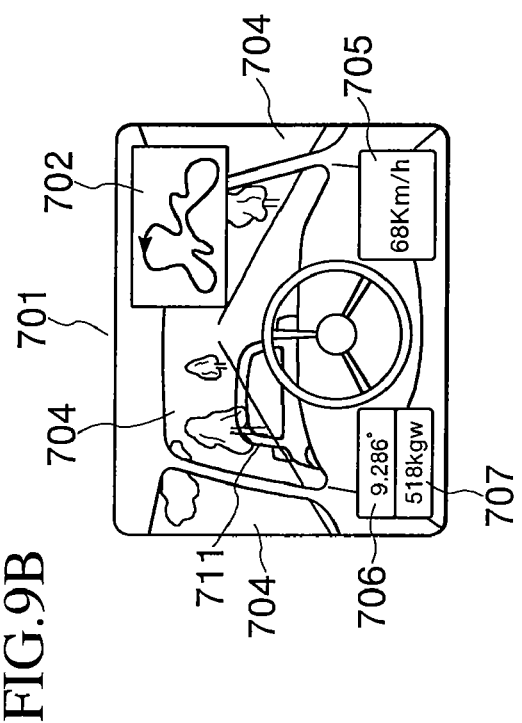
FIG.9B
FIG.9D

GAME DEVICE, GAME CONTROL, METHOD, INFORMATION RECORDING MEDIUM AND PROGRAM

TECHNICAL FIELD

The present invention relates to a game device and game control method suitable for showing a past operation history to a player in comparison with the current operation status, a computer readable information recording medium storing a program for realizing these on a computer, and the program.

BACKGROUND ART

Conventionally, there has been proposed a game technique for allowing a player to operate, by using a controller, a vehicle of any type such as a motorcycle, a car, or an airplane, or a character who runs and jumps on the ground, flies in the sky, or swims in the water (hereinafter collectively referred to as "object") in a virtual space such as a two-dimensional plane or a three-dimensional space, to move the object in the virtual space and participate in a competition. Such a game technique is disclosed in, for example, the following literature.

Patent Literature 1: Unexamined Japanese Patent Application Kokai Publication No. H11-114222

For such a game device, a "ghost" technique has been proposed for showing to the player in an easy-to-understand manner whether or not his/her current operation has improved in view of his/her past records. A game device employing the ghost technique records the history of the player's operation at each play. Given that the period from the start to the end of the game is called a "mission," the game device assesses the performance of the player in the mission each time a mission ends, and if the performance has improved, adopts and records that history as the history of the mission having the best performance. Then, in the next play, the game device uses the generated history of the best mission as if it were controller operation inputs from another player.

This makes it possible to compete with one's "past self." The object operated by the "past self" is called a "ghost," or "ghost car" in the case of a car race game. To distinguish the ghost from ordinary opponents, the ghost has also been made to appear semi-transparently. Unlike an ordinary game opponent, there is no collision of the ghost. The so-called "collision assessment" or "hit assessment" is not made.

DISCLOSURE OF INVENTION

Problem to be Solved by the Invention

Since the ghost pits the current self against the past self as described above, it is preferable if that image is displayed on the screen. On the other hand, because a collision assessment is not made, the situation where the ghost overlaps with the current self, something that is not possible in reality, do happens. Thus, a display technique for showing the ghost to the player in an easy-to-understand manner is strongly desired. The present invention has been made to overcome the problem, and it is an object of the present invention to provide a game device and game control method suitable for showing a past operation history to a player in comparison with the current operation status, a computer readable information recording medium storing a program for realizing these on a computer, and the program.

Means for Solving the Problem

To achieve the above objective, the following invention will be disclosed according to the principle of the present invention.

A game device according to a first aspect of the present invention includes an input receiving unit, a first moving unit, an input history storage unit, a second moving unit, an assessment unit, and a display unit, which are configured as follows.

Here, the input receiving unit receives a moving instruction input for instructing a first object in a virtual space to move. Typically, a controller included in the game device functions as the input receiving unit, and the first object constitutes an object such as a car, a motorcycle, an airplane, characters of various types, and the like (so-called "my car" or "player character," hereinafter conveniently referred to as "user's character") whose movement is determined by the operations of the player.

On the other hand, the first moving unit moves the first object in the virtual space by the moving instruction input received by the input receiving unit. A simple two-dimensional plane is employed as the virtual space for the simplest race game, but a two-dimensional plane having ups and downs may be employed for a car race, a motorcycle race, a horse race, a bicycle race, etc. Further, for a race of airplanes, helicopters, flying characters, etc., a race of submarines in water, a race of rockets in space, etc., a three-dimensional space is employed as the virtual space. Various game techniques may be used for the operation system of the user's character in the virtual space.

Furthermore, the input history storage unit stores the moving instruction input received by the input receiving unit as input history information. Operational statuses of the controller at a certain time, for example, the strength at which the controller buttons are pressed, the inclination of the lever, etc., are considered as the moving instruction input to be recorded as the input history information. As will be described later, since it is necessary to reproduce the current mission (or the mission having the best performance) by controlling the movement of the ghost by using the input history information, it is necessary to store all parameters used by the above-described first moving unit for moving the user's character.

Then, the second moving unit moves a second object in the virtual space by a moving instruction input stored in the past in the input history storage unit as input history information. The second moving unit has virtually the same configuration as the first moving unit as described above, but is different in that the second moving unit receives input history information while the first moving unit receives the operation instruction input of the player. Since the input history information includes all of the various parameters used by the first moving unit, the second object (hereinafter conveniently referred to as "ghost") reproduces the behavior of the user's character in a past mission using the second moving unit.

On the other hand, the assessment section assesses whether or not the first object and the second object are overlapping in the virtual space. For assessing whether or not the first object and second object are overlapping in the virtual space, there are various assessment techniques and approximation techniques that obtain approximate results, and these techniques may be applied as seen fit.

Then, the display unit displays the second object in a case where it has been assessed that the first object and the second object are not overlapping in the virtual space, and stops the display of the second object in a case where it has been assessed that the first object and the second object are overlapping. That is, the ghost is displayed when the ghost and the user's character are not overlapping. Since a collision assessment with the user's character is not made, the user's character and the ghost sometimes overlap and, when they do, the possibility exists that the ghost will be displayed unnecessarily large on the screen, making it difficult for the player to perform operations, or an unnatural display such as the inside of the ghost will occur.

The present invention makes it possible to naturally display the ghost to the player in an easy-to-view manner, thereby enabling the player to easily grasp his/her current status in comparison to his/her past self.

Further, in the game device of the present invention, the display unit may be configured to semi-transparently display the second object when the second object is to be displayed.

For example, in a case where the perspective is from behind the user's character and the graphics display is three-dimensional, the user's character is also displayed on the screen. When the ghost is displayed in the same manner as an ordinary opponent under such circumstances, the possibility exists that the user's character and the ghost will no longer be distinguishable. While one conceivable approach in such a case is to change the display colors of the user's character and the ghost, in the present invention, the ghost, which in some cases becomes transparent without appearing on the screen, is displayed semi-transparently. The present invention makes it possible for the player to easily distinguish the user's character and the ghost since the ghost is always semi-transparently displayed when displayed.

Further, in the game device of the present invention, the assessment unit may be configured to make the assessment that the first object and the second object are overlapping in a case where any polygon constituting the outline of the first object and any polygon constituting the outline of the second object intersect or are in contact.

The respective outlines (outer appearances) of the objects of the user's character and the ghost generally constitute polygons, and the overlapping or non-overlapping state of the objects is assessed based on whether or not the polygons intersect or contact each other. Furthermore, since the shapes of the user's character and the ghost are identical, in a case where one outline is completely covered by the other outline, the two completely overlap and, in this case, the polygons invariably contact each other. Thus, an assessment of the inclusion relationship between the objects need not be made.

The overlap assessment of the ghost and the user's character can be reduced to polygon intersection or contact assessment, and this assessment is often made at high-speed using the specialized hardware of three-dimensional graphics. Thus, the present invention makes it possible to perform high-speed overlap assessment.

Further, in the game device of the present invention, the assessment unit may be configured to make the assessment that the first object and the second object are overlapping in a case where a sphere or cuboid encapsulating the first object and a sphere or cuboid encapsulating the second object intersect or are in contact.

When the number of polygons constituting the outer appearances (outlines) of the user's character and the ghost becomes high, a significant amount of time may be required to assess whether or not the polygons intersect or are in contact. In the present invention, the overlap assessment is approximately made in response to such cases.

In a case where the sphere or cuboid covering the user's character and the sphere or cuboid covering the ghost intersect or are in contact, the assessment is made that the user's character and the ghost are overlapping. Use of the sphere or cuboid may be selected based on which is more appropriate according to the rough shape of the user's character and the ghost.

The present invention makes it possible to make an overlap assessment at high speed, even in a case where the number of polygons constituting the outer appearances (outlines) of the user's character and the ghost is high.

Further, in the game device of the present invention, the display unit may be configured to use, as a position in which the second object is to be displayed, a position at which the second object is seen from a viewpoint which moves in the virtual space in conjunction with the first object. This is one of the preferred embodiments of the present invention, and is for displaying how the external world is seen from a camera, which moves together with the user's character. This is appropriate for capturing the external world from a vehicle-mounted camera in a car race and displaying it, and displays a virtual three-dimensional space on a two-dimensional screen by three-dimensional graphics techniques.

The present invention is particularly appropriate for a case where both the user's character and the ghost are displayed on the screen, that is, for a case where a display method that places the camera behind the user's character is employed and, in such a case, makes it possible to appropriately display the virtual world to the player without displaying the unnatural state of a "collision" between the ghost and the user's character.

A game control method according to another aspect of the present invention is executed on a game device comprising an input receiving unit, a first moving unit, an input history storage unit, a second moving unit, an assessment unit, and a display unit, and comprises an input receiving step, a first moving step, an input history storage step, a second moving step, an assessment step, and a display step, which are configured as follows.

First, in the input receiving step, the input receiving unit receives a moving instruction input for instructing a first object in a virtual space to move.

Meanwhile, in the first moving step, the first moving unit moves the first object in the virtual space by the moving instruction input received by the input receiving unit.

Furthermore, in the input history storage step, the moving instruction input received by the input receiving unit is stored in the input history storage unit as input history information.

Then, in the second moving step, the second moving unit moves a second object in the virtual space by a moving instruction input stored in the past in the input history storage unit as input history information.

Meanwhile, in the assessment step, the assessment unit assesses whether or not the first object and the second object are overlapping in the virtual space.

Furthermore, in the display step, the display unit displays the second object in a case where it has been assessed that the first object and the second object are not overlapping in the virtual space, and stops the display of the second object in a case where it has been assessed that the first object and the second object are overlapping.

A program according to another aspect of the present invention is configured to control a computer to function as the above-described game device, or to execute the above-described game control method on a computer.

The program of the present invention can be recorded on a computer readable information storage medium, such as a compact disk, a flexible disk, a hard disk, a magneto-optical disk, a digital video disk, a magnetic tape or a semiconductor memory.

The program can be distributed and sold, independently of a computer which executes the program, over a computer communication network. The information storage medium can be distributed and sold, independently of the computer.

Effect of the Invention

According to the present invention, it is possible to provide a game device and game control method suitable for showing a past operation history to a player in comparison with the current operation status, a computer readable information recording medium storing a program for realizing these on a computer, and the program.

BRIEF DESCRIPTION OF DRAWINGS

FIG. 9 An explanatory diagram illustrating the state where the space between the user's character and the ghost gradually decreases.

Figure 1:
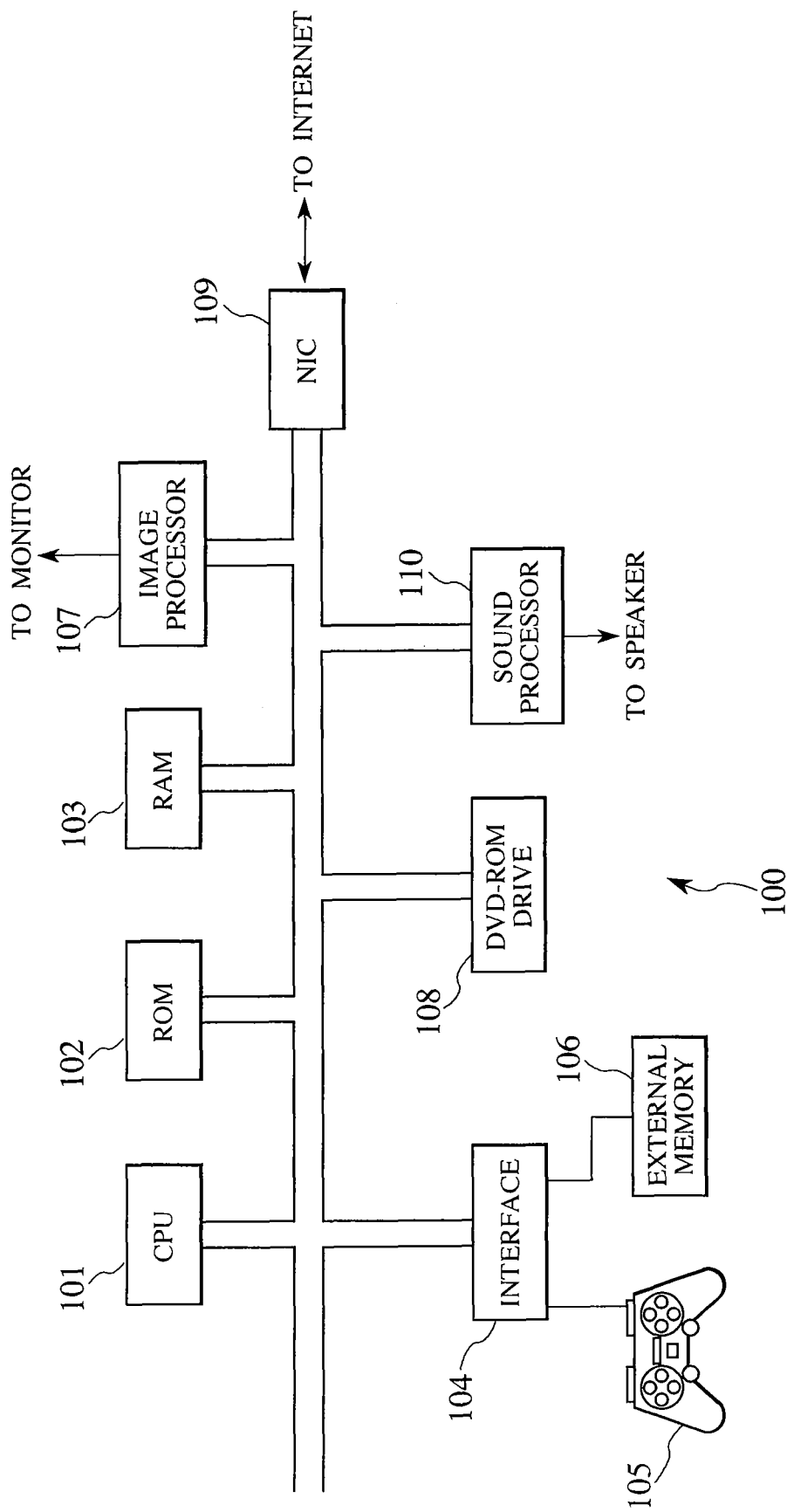
FIG. 1 An explanatory diagram illustrating the schematic configuration of a typical information processing device on which a display device according to one embodiment of the present invention is realized.

DESCRIPTION OF REFERENCE NUMERALS 100 information processing device
101 CPU
102 ROM
103 RAM
104 interface
105 controller
106 external memory
107 image processor
108 DVD-ROM drive
109 NIC
110 sound processor
201 ↑ button
202 ↓ button
203 ← button
204 → button
205 ○ button
206 x button
207 △ button
208 □ button
209 SELECT button
210 START button
211 ANALOG button
212 indicator
213 joystick
214 joystick
215 L1 button
216 L2 button
217 R1 button
218 R2 button
301 game device
302 input receiving unit
303 first moving unit
304 input history storage unit
305 second moving unit
306 assessment unit
307 display unit
331 current input history array
332 past input history array
333 current passage history array
334 past passage history array
701 screen
711 ghost

BEST MODE FOR CARRYING OUT THE INVENTION

An embodiment of the present invention will be described below. While the following describes an embodiment in which the invention is adapted to a game device on which three-dimensional graphics are displayed for the ease of understanding, the invention can also be adapted to information processing apparatuses, such as various computers, PDAs (Personal Data Assistants) and cellular phones. That is, the embodiment to be described below is given by way of illustration only, and does not limit the scope of the invention. Therefore, those skilled in the art can employ embodiments in which the individual elements or all the elements are replaced with equivalent ones, and which are also encompassed in the scope of the invention.

Embodiment 1

FIG. 1 is an explanatory diagram illustrating the schematic configuration of a typical information processing device on which a display device of the present invention will be realized. A description will be given hereinbelow referring to the diagram.

An information processing device 100 comprises a CPU (Central Processing Unit) 101, a ROM 102, a RAM 103, an interface 104, a controller 105, an external memory 106, an image processor 107, a DVD-ROM drive 108, an NIC (Network Interface Card) 109, and a sound processor 110.

As a DVD-ROM storing a program and data for a game is loaded into the DVD-ROM drive 108 and the information processing device 100 is powered on, the program is executed to realize the display device of the embodiment.

The CPU 101 controls the general operation of the information processing device 100, and is connected to individual components to exchange a control signal and data therewith. Further, by using an ALU (Arithmetic Logic Unit) (not shown), the CPU 101 can perform arithmetic operations such as addition, subtraction, multiplication, division, etc., logical operations such as logical addition, logical multiplication, logical negotiation, etc., bit operations such as bit addition, bit multiplication, bit inversion, bit shift, bit rotation, etc., on a storage area, or a register (not shown) which can be accessed at a high speed. Furthermore, the CPU 101 itself may be designed to be able to rapidly perform saturate operations such as addition, subtraction, multiplication, division, etc., for handling multimedia processes, vector operations such as trigonometric function, etc., or may realize these with a coprocessor.

An IPL (Initial Program Loader) which is executed immediately after power-on is recorded in the ROM 102. As the IPL is executed, the program recorded in the DVD-ROM is read into the RAM 103 and is executed by the CPU 101. Further, the RAM 102 stores a program and various data for an operating system necessary for controlling the overall operation of the information processing device 100.

The RAM 103 is for temporarily storing data and programs, and retains the program and data read from the DVD-ROM, and other data needed for progressing a game and chat communication. Further, the CPU 101 performs processes such as securing a variable area in the RAM 103 to work the ALU directly upon the value stored in the variable to perform operations, or once storing the value stored in the RAM 103 in the register, performing operations on the register, and writing back the operation result to the memory, etc.

The controller 105 connected via the interface 104 receives an operation input which is made when a user plays a game such as a racing game.

Figure 2:
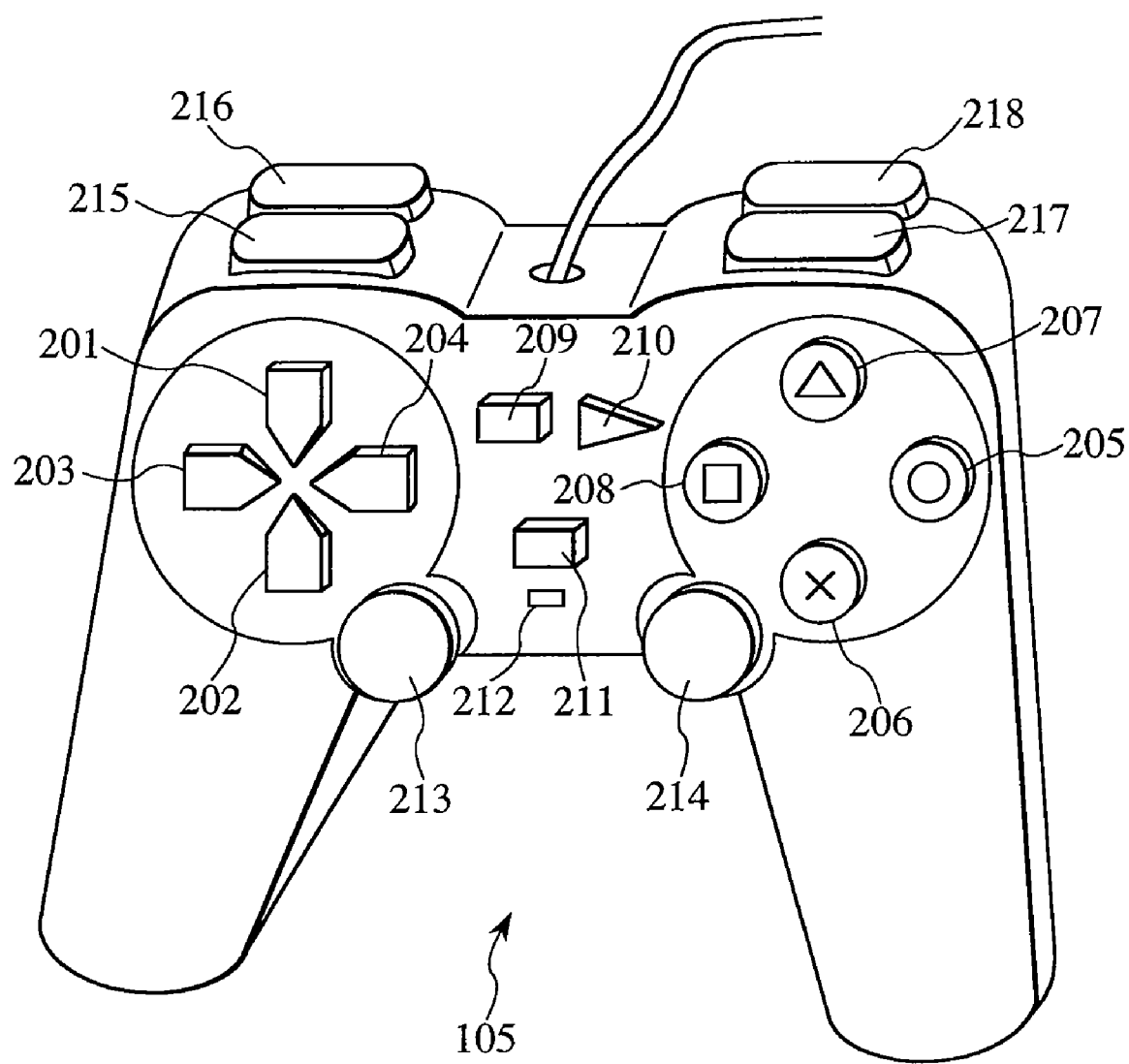
FIG. 2 An exemplary diagram illustrating the schematic configuration of a controller comprised in the information processing device according to one embodiment of the present invention.

FIG. 2 is an explanatory diagram illustrating the outer appearance of the controller 105. A description will be given hereinbelow referring to the diagram.

Arranged on the left side of the controller 105 are a ↑ button 201, a ↓ button 202, a ← button 203, and a → button 204, which are used for making operation inputs directing upward, downward, leftward, and rightward.

Arranged on the right side are a ○ button 205 used for making an affirmative operation input, an x button 206 used for making a cancel operation input, a Δ button 207 used for making an instruction input for menu display, etc., and a □ button 208 used for making an instruction input for other purposes.

At the center, an ANALOG button 211 for instructing start or stop of analog input and an indicator 212 for indicating whether an analog input is enabled or disabled are arranged, in addition to a SELECT button 209 and a START button 210.

Joysticks 213 and 214 for making instruction inputs associated with intensity in directions not limited to the upward, downward, leftward, and rightward directions are arranged on the lower center section.

Furthermore, an L1 button 215, an L2 button 216, an R1 button 217, and an R2 button 218, which can be used for various operation inputs, are arranged on the upper section.

The buttons 201 to 208 and 215 to 218 of the controller 105 are each equipped with a pressure sensor, so that which button pressed can be detected and the level of the pressure of the user's pressing operation can be obtained based on 256 levels of 0 to 255, in a case where analog input is enabled.

The joysticks 213 and 214 of the controller 105 are equipped with a strain gauge, so that the direction and the degree to which these are bent can be detected.

Returning to FIG. 1, the external memory 106 detachably connected via the interface 104 rewritably stores data indicating the play status (past performance, etc.) of a racing game, etc., data indicating the progress status of the game, data of chat communication logs (records), etc. As the user makes an instruction input via the controller 105, these data can adequately be recorded in the external memory 106.

The program for realizing the game and the image data and sound data accompanying the game are recorded in the DVD-ROM to be loaded into the DVD-ROM drive 108. Under the control of the CPU 101, the DVD-ROM drive 108 performs a process of reading from the DVD-ROM loaded therein to read a necessary program and data, and these are temporarily stored in the RAM 103 or the like.

The image processor 107 processes data read from the DVD-ROM by means of the CPU 101 and an image operation processor (not shown) the image processor 107 has, and then records the data in a frame memory (not shown) in the image processor 107. The image information recorded in the frame memory is converted to a video signal at a predetermined synchronous timing, which is in turn output to a monitor (not shown) connected to the image processor 107. Thereby, image displays of various types are available.

The image operation processor is capable of fast execution of an overlay operation of a two-dimensional image, a transparent operation like α blending, and various kinds of saturate operations.

It is also possible to enable fast execution of an operation of rendering polygon information which is arranged in virtual three-dimensional space and to which various kinds of texture information are added, by a Z buffer scheme to acquire a rendered image with a downward view of a polygon toward a predetermined view point position, arranged in the virtual three-dimensional space, from the predetermined view point position.

Further, the CPU 101 and the image operation processor cooperate to be able to write a string of characters as a two-dimensional image in the frame memory or on each polygon surface according to font information which defines the shapes of characters.

The NIC 109 serves to connect the information processing device 100 to a computer communication network (not shown), such as the Internet. The NIC 109 includes an analog modem according to the 10 BASE-T/101 BASE-T standard which is used at the time of constructing a LAN (Local Area Network) or for connecting to the Internet using a telephone circuit, an ISDN (Integrated Services Digital Network) modem, an ADSL (Asymmetric Digital Subscriber Line) modem, a cable model for connecting to the Internet using a cable television circuit, or the like, and an interface (not shown) which intervenes between these modems and the CPU 101.

The sound processor 110 converts sound data read from the DVD-ROM to an analog sound signal, and outputs the sound signal from a speaker (not shown) connected to the sound processor 110. Under the control of the CPU 101, the sound processor 110 generates effect sounds and music data to be generated during progress of the game, and outputs sounds corresponding thereto from the speaker.

In a case where the sound data recorded on the DVD-ROM is MIDI data, the sound processor 110 refers to the sound source data included in the data, and converts the MIDI data to PCM data. Further, in a case where the sound data is compressed sound data of ADPCM format or Ogg Vorbis format, etc., the sound processor 110 expands the data, converting it to PCM data. The PCM data is D/A (Digital/Analog) converted at a timing corresponding to the sampling frequency of the data and output to the speaker, thereby enabling sound output.

In addition, the information processing device 100 may be configured to achieve the same functions as the ROM 102, the RAM 103, the external memory 106, and the DVD-ROM or the like which is to be loaded into the DVD-ROM drive 108 by using a large-capacity external storage device, such as a hard disk.

Figure 3:
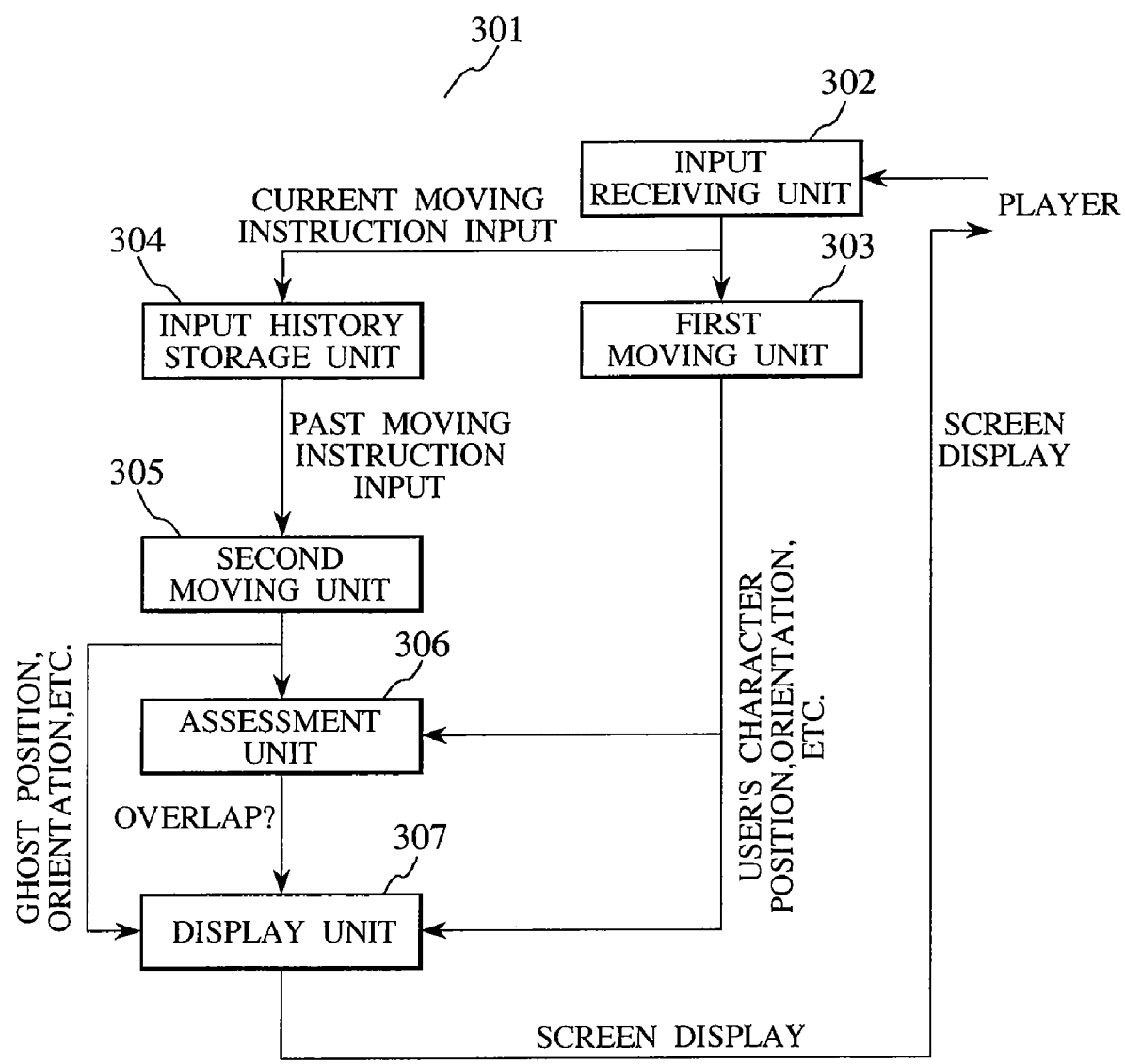
FIG. 3 An exemplary diagram illustrating the schematic configuration of a game device according to one embodiment of the present invention.
Figure 4:
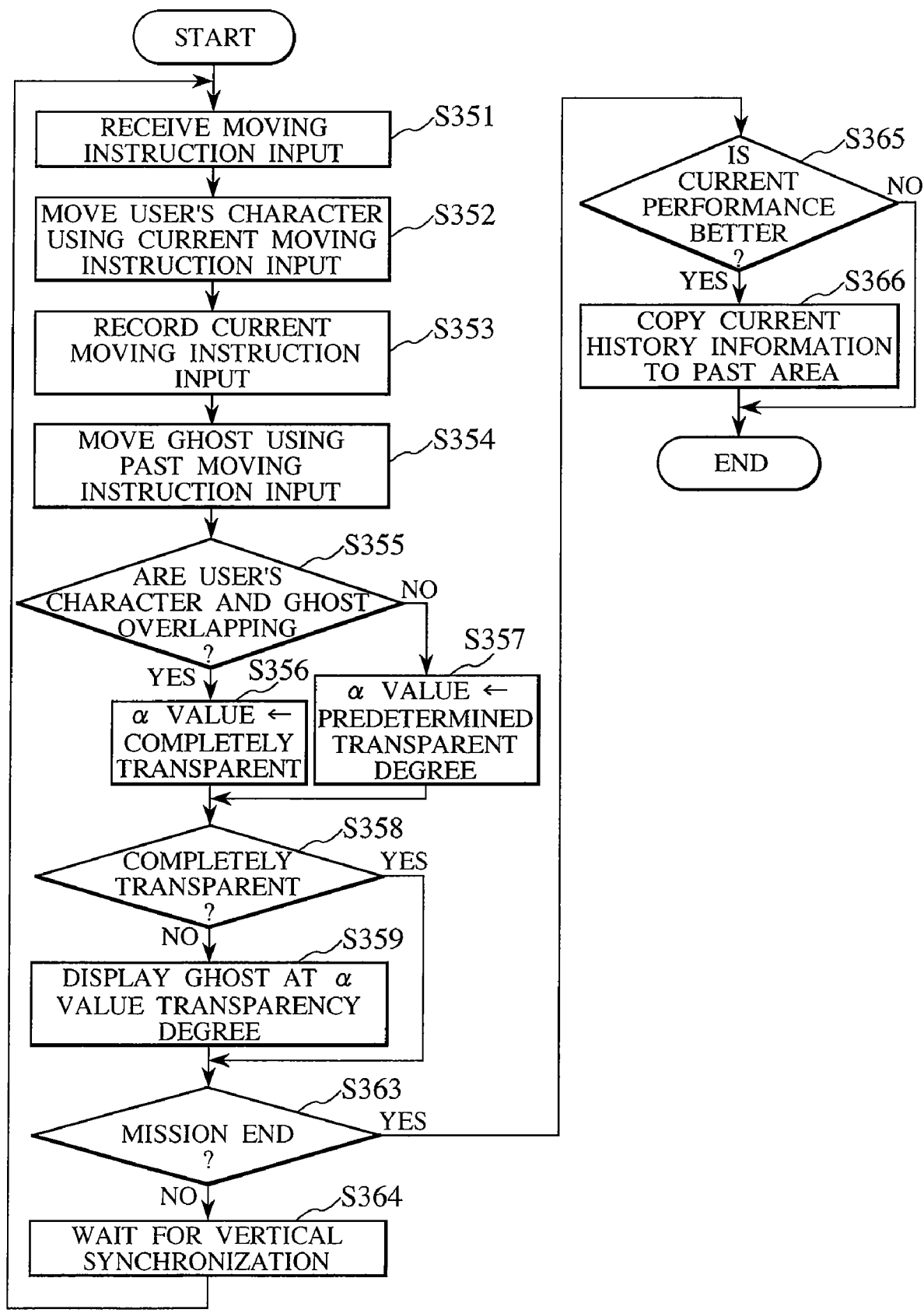
FIG. 4 A flowchart showing the flow of control of a game control process performed by the game device according to one embodiment of the present invention.

FIG. 3 is an exemplary diagram illustrating the schematic configuration of a game device according to one embodiment of the present invention. The game device is realized on the above-described information processing device 100. On the other hand, FIG. 4 is a flowchart showing the flow of control of a game control process performed by the game device. A description will be given hereinbelow referring to these diagrams.

A mode in which a two-dimensional plane where there exist ups and downs for a car race is employed as a virtual space and the state captured from a virtual vehicle-mounted camera fixed on a car of the user's character is displayed on the screen will be described as an example below.

The game device 301 of the present embodiment comprises an input receiving unit 302, a first moving unit 303, an input history storage unit 304, a second moving unit 305, an assessment unit 306, and a display unit 307.

When the present game control process is started, the input receiving unit 302 of the game device 301 receives a move instruction input which instructs the user's character to move in the virtual space (step S351). In the above-described information processing device 100, the controller 105 functions as the input receiving unit 302, but a controller having another shape such as a steering wheel, an accelerator, a brake, a lever of various types, etc., may be used or an input device such as a keyboard and a mouse used for an ordinary computer may be used as the input receiving unit 302.

The received moving instruction input is expressed by a set of parameters of operation states of the controller 105, such as the states of the pressing operation on each button (may include whether it is pressed or untouched, and the level of the pressing force), the direction in which the joysticks are bent and the level of bending, etc.

Next, the first moving unit 303 moves the user's character in the virtual space based on a moving instruction input received by the input receiving unit 302 (step S352). An input format in which the user's character moves in the direction in which the arrow buttons 201 to 204 of any type or the joysticks 213 and 214 are operated is often used, but it is possible to appropriately change which buttons, etc., of the controller 105 are used for what kinds of functions, depending on the content of the game.

Furthermore, according to the present embodiment, steering wheel operations are performed by the joystick 213 and braking operations are performed by the joystick 214.

Since the present embodiment relates to a car game, a controller of any type such as a steering wheel, a brake, an accelerator, a shifter, etc., is used as the input receiving unit 302, and the car in the virtual space is operated and the user's character is moved using the states (parameters such as position, inclination, etc.) of these operations. Information regarding the user's character, such as the position in the virtual space, is appropriately stored in a predetermined area in the RAM 103.

Thus, the CPU 101 functions as the first moving unit 303 with the controller 105.

Furthermore, the input history storage unit 304 stores the moving instruction input received by the input receiving unit 302 as input history information (step S353).

Figure 5:
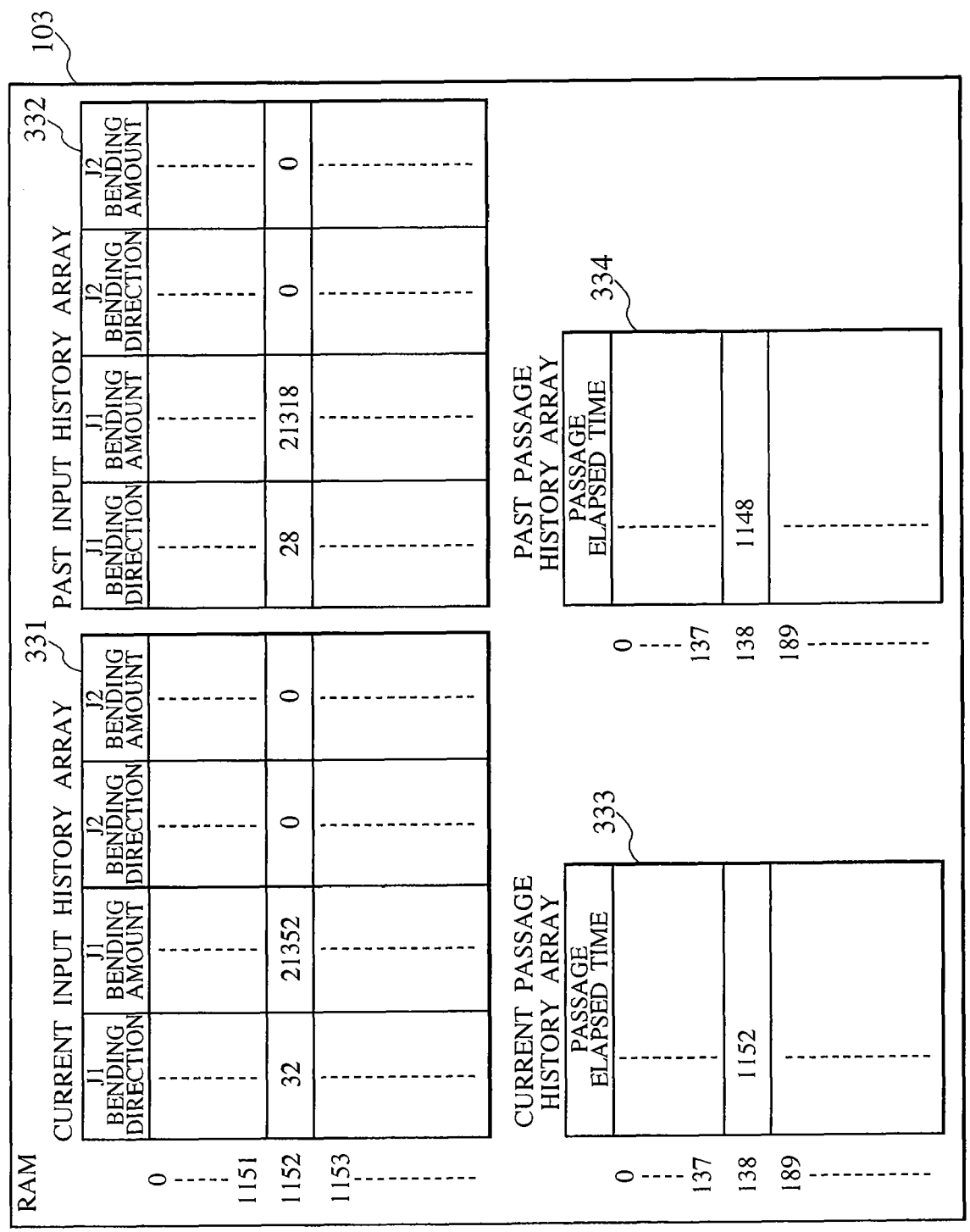
FIG. 5 An explanatory diagram illustrating the state of history information stored in a RAM.
Figure 6A:
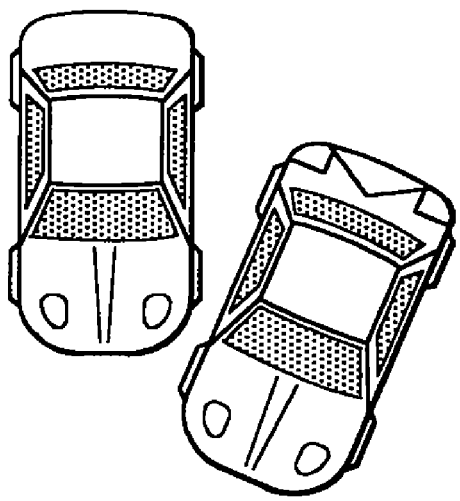
FIG. 6 An explanatory diagram illustrating the overlap relationship between the user's character and the ghost in the game device of the present embodiment.
Figure 6A:
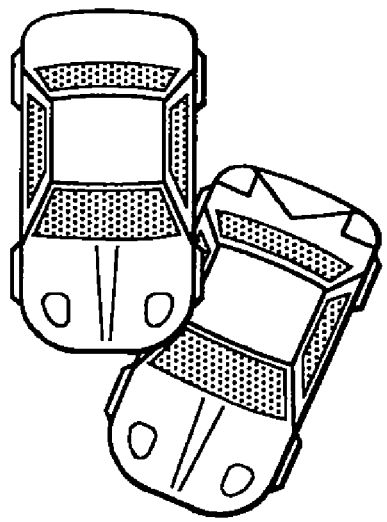
Figure 6B:
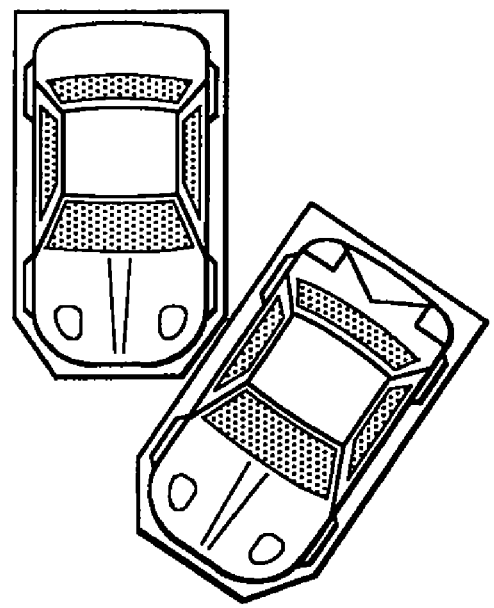
Figure 6B:
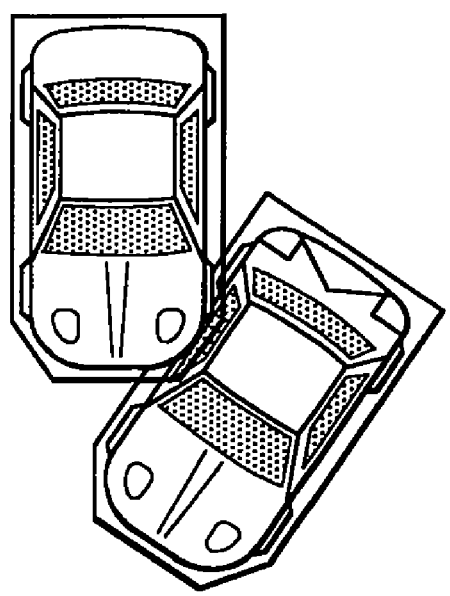
Figure 7A:
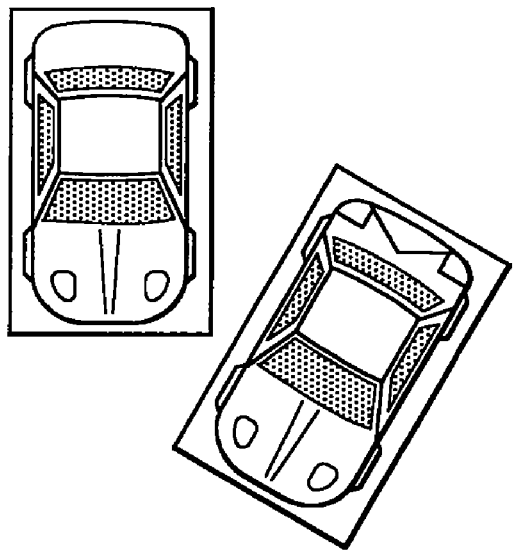
FIG. 7 An explanatory diagram illustrating the overlap relationship between the user's character and the ghost in the game device of the present embodiment.
Figure 7A:
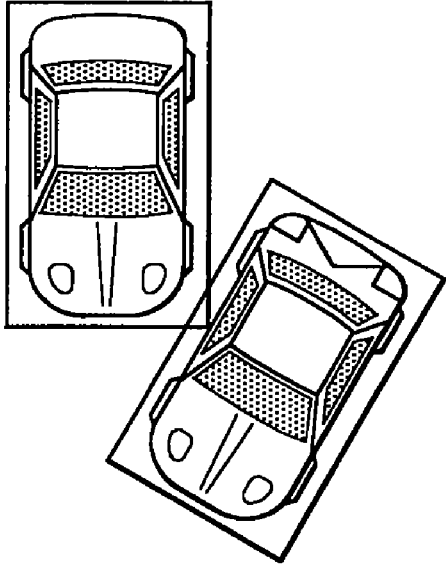
Figure 7B:
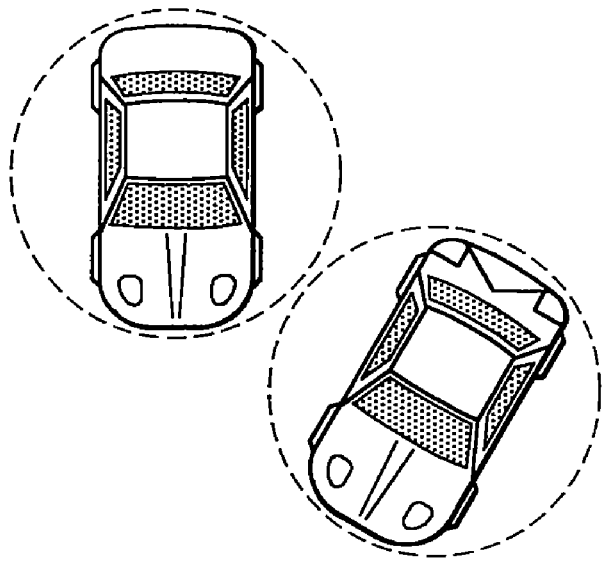
Figure 7B:
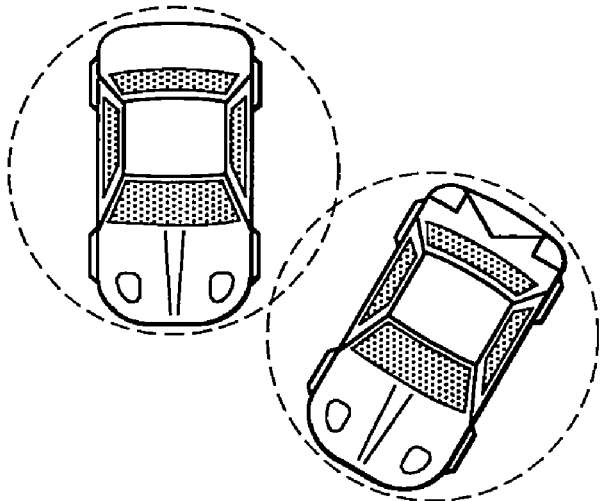

In the present embodiment, the quotient obtained by dividing the time that has elapsed since the current mission began by the cycle (approx. 1/60 second) of vertical synchronization interrupts is considered "elapsed time." FIG. 5 is an explanatory diagram illustrating the state of history information stored in the RAM 103.

Input history information is stored in a current input storage array 331 in the RAM 103. The subscripts of the current input history array 331 correspond to the above-described "elapsed time." All of the input parameters of the controller 105 used for operating the user's character in step S352 can be stored for each element of the current input history array 331.

In the present embodiment, the bending direction and bending amount of the joystick 213 and the bending direction and bending amount of the joystick 214 are to be stored in the elements of the current input history array 331. In the present embodiment, the bending direction is stored in the range of −180 degrees to +180 degrees, indicating how many degrees the joystick is rotated in the counterclockwise direction, where the upward direction is the reference direction, and the bending amount is recorded in the range of 0 to 32767.

In the present diagram, in the $1152^{nd}$ element is recorded that the bending direction of joystick 213 (corresponding to the steering wheel) is 32 degrees in the leftward direction (JI bending direction) and the bending level thereof is 21352 (J1 bending amount), and that the bending direction of joystick 214 (corresponding to the brake) is 0 degrees (J2 bending direction) and the bending level thereof is 0 (J2 bending amount). This means that the steering wheel is turned to the left with no braking.

A past input history array 332 is also prepared in the RAM 103. The past input history array 332 has the same structure as the current input history array 331, but is different in that the input history information (typically of the mission having the best performance) obtained in a past game play is recorded therein.

The second moving unit 305 moves the ghost in the virtual space, based on a moving instruction input stored in the input history storage unit 304 in the past as input history information, that is, a moving instruction input recorded in the past input history array 332 (step S354).

In a case where, as considered in the above-described example, the information of the joysticks 213 and 214 is recorded in the $1152^{nd}$ element in step S353 in the current repeating unit (as illustrated, this process has a repeating structure), the ghost is moved in step S354 using the values (in the present diagram, 28, 21318, 0, 0) recorded in the $1152^{nd}$ element of the past input history array 332. The handling of the parameters and various calculations at the time the ghost is moved are the same as those of the first moving unit 303.

Thus, the RAM 103 secures the current input history array 331 and the past input history array 332, and functions as the input history storage unit 304 under the control of the CPU 101.

Subsequently, the CPU 101 assesses whether or not the user's character and the ghost are overlapping in the virtual space (step S355).

FIG. 6 and FIG. 7 are explanatory diagrams illustrating the state of assessment of overlap of the user's character and the ghost. A description will be given hereinbelow referring to these diagrams.

The following are possible methods for overlap assessment:

(1) When the polygons constituting the respective outlines of the user's character and the ghost intersect or contact one another, the state is assessed as overlapping.

(2) When representative points approximately indicating the respective outlines of the user's character and the ghost are selected and the polyhedrons determined by these representative points intersect or contact one another, the state is assessed as overlapping.

(3) When the cuboid containing the user's character and cuboid containing the ghost intersect or contact one another, the state is assessed as overlapping. This is the preferred embodiment of the above-described (b).

(4) When the sphere containing the user's character and sphere containing the ghost intersect or contact one another, the state is assessed as overlapping.

By method (1), the overlap assessment of the user's character and the ghost can be precisely made, but the calculation amount becomes substantial in a case where there are many polygons [FIG. 6 (a)].

By method (2), the respective outlines of the user's character and the ghost are approximated using the polyhedrons [FIG. 6 (b)] determined by the representative points approximately indicating the respective outlines of the user's character and the ghost. In consequence, while a case where the user's character and the ghost are truly overlapping as well as a case where the user's character and the ghost are truly not overlapping may be assessed as "overlapping," in the present embodiment this corresponds to a shift in assessment criteria toward a state in which the player finds the screen easy to view and therefore is not problematic. The same holds true for the following methods as well.

Method (3) approximately indicates the respective outlines of the user's character and the ghost using cuboids containing the user's character and the ghost [FIG. 7 (a)].

Method (4) approximately indicates the respective outlines of the user's character and the ghost using spheres containing the user's character and the ghost [FIG. 7 (b)].

Furthermore, since the ghost indicates the history of a past play by the player using the user's character, the shapes of the two should match.

In a case where the ghost car used is the car among the various cards used in the past by the player that has the best performance record, the shapes may not necessarily match. In this case, an overlapping state where one car (such as a large-sized car) completely covers the other car (such as a small-sized car) is possible.

Such circumstances make it difficult to assess the overlap state based on the intersection of polygons, but overlap assessment is relatively easy based on the intersection of cuboids or spheres. Thus, the above-described methods (3) and (4) are highly effective approximate assessment means.

Thus, the CPU 101 functions as the assessment unit 306 with the RAM 103.

Then, the CPU 101 records α value indicating "completely transparent" (step S356) in a predetermined α value area in the RAM 103 in a case where overlapping has been identified (step S355: Yes), and records a predetermined transparency degree value for the ghost (step S357) in the α value area in a case where overlapping has not been identified (step S355: No), and the flow proceeds to step S358.

Furthermore, before the present processing begins, an appropriate initial value is prerecorded in each area as well as in the predetermined α value area in the RAM 103, but for ease of comprehension, a description of this processing is omitted in the present diagram.

Then, display section 307 assesses whether or not the transparency degree recorded in the predetermined α value area of the RAM 103 is "completely transparent" (step S358) and, if not "completely transparent" (step S358: No), displays the ghost in the virtual space at the transparency degree recorded in the predetermined α value area of the RAM 103 (step S359), and the flow proceeds to step S363.

Furthermore, in the present embodiment, other than the setting of the transparency degree of the ghost as described above, ordinarily used three-dimensional graphics techniques for car race games are applied.

As described above, since it is customary practice not to perform collision assessment between the user's character and the ghost, the ghost and the user's character virtually overlap each other in a case where the performance of the ghost is virtually the same as the performance of the user's character. In such a case, conventionally the ghost is displayed (though semi-transparently) on the screen, making it difficult to observe the state of the external world and the state of the other opponents. In the present embodiment, however, in such a case the ghost is not displayed so that the player's vision is never hindered.

On the other hand, in a case where the two are not overlapping (particularly, in a case where the ghost precedes the user's character), the ghost is displayed, thereby enabling the player to continue the game using the ghost as an objective.

Figure 8:
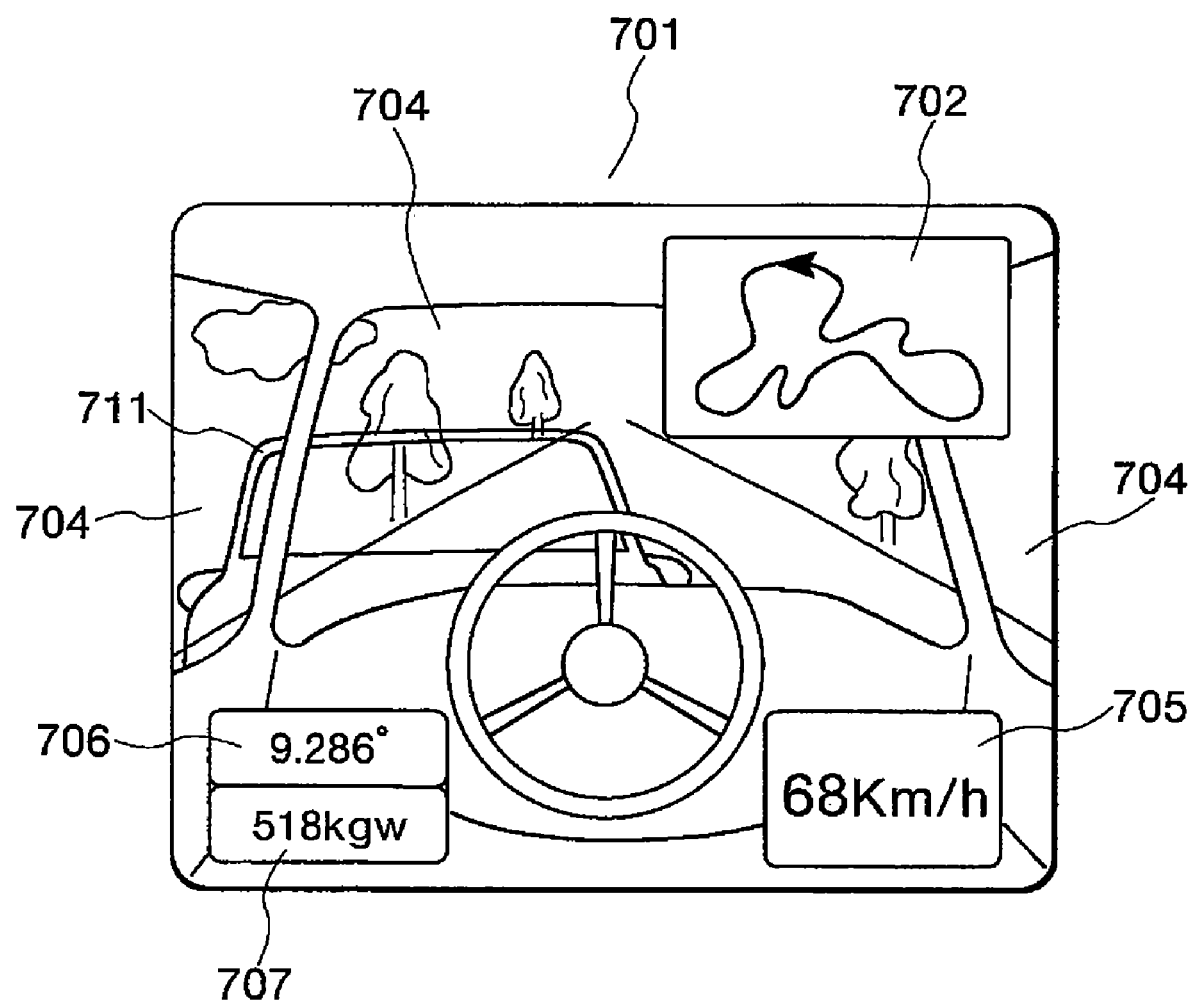
FIG. 8 An explanatory diagram showing an example of display of the game device of the present embodiment.

FIG. 8 is an exemplary diagram illustrating the states of the screen display of the present embodiment, and indicates the states of the external world as seen from a camera which moves together with the user's character. This is the same as capturing the external world from a vehicle-mounted camera in a car race and displaying it, and displays a virtual three-dimensional space on a two-dimensional screen by three-dimensional graphics techniques.

FIG. 9 illustrates the states as the user's character and the ghost gradually approach one another. During the period the user's character and the ghost do not overlap [(a) to (c) of the present diagram], the ghost 711 is displayed transparently on the screen 701 such that the background is seen therethrough. On the other hand, when the two do overlap [(d) of the present diagram], the ghost is no longer displayed on the screen.

In this manner, it is possible to show the ghost and objects other than the ghost to the player in an easy-to-view manner, in accordance with circumstance.

Then, it is determined whether or not the current mission has ended (step S363), and if the current mission has not ended (step S363: No), the flow returns to step S351 after waiting for a vertical synchronization interrupt (step S364). On the other hand, in a case where the current mission has ended (step S363: Yes), the performance of the user's character and the performance of the ghost in the current mission are compared (step S365). If the performance of the user's character is superior (step S365: Yes), the content of the current input history array 331 is copied to the past input history array 332 (step S366) to prepare for the next play and thereafter, and the present process is terminated.

On the other hand, in a case where the performance of the ghost is superior (step S365: No), the present process is terminated without performing the copying.

Furthermore, in the copying, rather than just a simple comparison of performance, the player may be asked whether or not he/she would like the mission to be copied. Further, it is also possible to employ a method of preparing a plurality of sets of past input history arrays 332, ask which area to store the mission, or store the latest several missions in all areas. Or, it is possible to employ an appropriate combination thereof. In a case where a plurality of sets of past history exists, it is also possible to employ a method of asking the player which is to be the ghost before the mission starts, or to employ all as ghosts.

Furthermore, as shown in the present diagram, a plurality of markers are established on the road in accordance with the distance from the start point, and the current passage history array 333 and the past passage history array 334 are prepared as history areas for recording the time at which these markers are passed. With these arrays as well, similar to the input history recorded in the current input history array 331, etc., the history of moving may be stored in the current passage history array 333 and appropriately copied according to performance, and the ghost may be moved using the information recorded in the past passage history array 334 rather than the information stored in the past input history array 332.

As a result, the operation history (typically, that of the best performance) of the past self of the player (or another person)

is reproduced as the ghost, making it possible for the player to easily assess whether or not the performance improves even during the play, by observing the transparency degree of the ghost.

Other than the above, it is possible to employ a method of changing or shifting the transparency degree and the hue of the ghost when the ghost is displayed, depending on the moving speed of the ghost, for example.

For example, the hue of the ghost is changed depending on the difference in moving speed of the ghost and the user's character. Typically, the hue change is increased as the difference in speed between the ghost and the user's character increases. In this case, it is also possible to pre-arrange the association such that the direction in which the amount of hue is shifted changes when the difference changes from positive to negative.

For example, in a case where the ghost is faster than the user's character, the difference obtained when the speed of the user's character is simply subtracted from the speed of the ghost is positive, while in a case where the user's character is slower than the ghost, the difference is negative. Here, for example, the hue is shifted in the red direction in a case where the difference is a positive value, and the hue is shifted in the blue direction in a case where the difference is a negative value. Also in this case, the ghost is displayed semi-transparently.

In this manner, it is possible to show to the player in an easy-to-understand manner whether the user's character or the ghost is moving at a faster speed, by the change in the hue of the ghost, enabling the player to perform maneuvers depending on the change in the hue.

The present application claims priority based on Japanese Patent Application No. 2005-52548, the content of which is incorporated herein in its entirety.

INDUSTRIAL APPLICABILITY

As explained above, according to the present invention, it is possible to provide a game device and game control method suitable for showing a past operation history to a player in comparison with the current operation status, a computer readable information recording medium for storing a program for realizing these on a computer, and the program, and to apply these to realizing various competition games, etc., in a game device and to virtual reality techniques for providing various virtual experiences for educational purposes, etc.

The invention claimed is:

1. A game device comprising:
an input receiving device that receives a moving instruction input for instructing a first object in a virtual space to move;
a first moving device that moves the first object in the virtual space by the moving instruction input received by the input receiving device;
an input history storage device that stores the moving instruction input received by the input receiving device as input history information;
a second moving device that moves a second object in the virtual space by a moving instruction input stored in the past in the input history storage device as input history information;
an assessment device that assesses whether the first object and the second object are overlapping or not overlapping in the virtual space; and
an alpha value storing device in which an alpha value for the second object is stored;
an alpha value recording device that records one of: (i) a predefined alpha value in said alpha value storing device when said assessment device assesses that the first object and the second object are not overlapping, and (ii) a second alpha value indicating complete transparency in said alpha value storing device when said assessment device assesses that the first object and the second object are overlapping;
a display device that generates an image depicting one of (1) the second object at a transparency degree associated with the alpha value stored in the alpha value storing device and other objects in the virtual space if the value stored in said alpha value storing device does not indicate complete transparency and (2) said other objects in the virtual space if the alpha value stored in said alpha value storing device indicates complete transparency, and displays said generated image.

2. The game device according to claim 1, wherein the predefined alpha value indicates translucency.

3. The game device according to claim 1, wherein the assessment device assesses that the first object and the second object are overlapping when any polygon constituting the outline of the first object and any polygon constituting the outline of the second object intersect or are in contact.

4. The game device according to claim 1, wherein the assessment device assesses that the first object and the second object are overlapping when a sphere or cuboid containing the first object and a sphere or cuboid containing the second object intersect or are in contact.

5. The game device according to claim 1, wherein the display device uses as a position in which the second object is to be displayed, a position at which the second object is seen from a viewpoint which moves in the virtual space in conjunction with the first object.

6. A game control method that uses an input history storage unit in which input history storage information is stored, and an alpha value storing unit in which an alpha value is stored, comprising:
an input receiving step of receiving a moving instruction input for instructing a first object in a virtual space to move;
a first moving step of moving the first object in the virtual space by the moving instruction input received in the input receiving step;
an input history storage step of storing the moving instruction input received in the input receiving step as input history information;
a second moving step of moving a second object in the virtual space by a moving instruction input stored in the past in the input history storage unit as input history information;
an assessment step of assessing whether the first object and the second object are overlapping or not overlapping in the virtual space; and
an alpha value recording step of recording one of (i) a predefined alpha value in said alpha value storing unit when said assessment unit assesses that the first object and the second object are not overlapping, and (ii) a second alpha value indicating complete transparency in said alpha value storing unit when said assessment unit assesses that the first object and the second object are overlapping;
a display step of generating an image depicting one of: (1) the second object at a transparency degree associated with the alpha value stored in said alpha value storing unit and other objects in the virtual space if the value stored in said alpha value storing unit does not indicate complete transparency and (2) said other objects in the virtual space if the alpha value stored in said alpha value storing unit indicates complete transparency, and displaying said generated image.

7. A computer-readable non-transitory information recording medium storing a program for controlling a computer to function as:
- an input receiving unit that receives a moving instruction input for instructing a first object in a virtual space to move;
- a first moving unit that moves the first object in the virtual space by the moving instruction input received by the input receiving unit;
- an input history storage unit that stores the moving instruction input received by the input receiving unit as input history information;
- a second moving unit that moves a second object in the virtual space by a moving instruction input stored in the past in the input history storage unit as input history information;
- an assessment unit that assesses whether the first object and the second object are overlapping or not overlapping in the virtual space; and
- an alpha value storing unit in which an alpha value for the second object is stored;
- an alpha value recording unit that records one of (i) a predefined alpha value in said alpha value storing unit when said assessment unit assesses that the first object and the second object are not overlapping and (ii) a second alpha value indicating complete transparency in said alpha value storing unit when said assessment unit assesses that the first object and the second object are overlapping;
- a display unit that generates an image depicting one of: (1) the second object at a transparency degree associated with said alpha value stored in said alpha value storing unit and other objects in the virtual space if the value stored in said alpha value storing unit does not indicate complete transparency and (2) an image depicting said other objects in the virtual space if the alpha value stored in said alpha value storing unit indicates complete transparency, and displays said generated image.

* * * * *